US011857484B2

(12) United States Patent
Demeter

(10) Patent No.: US 11,857,484 B2
(45) Date of Patent: Jan. 2, 2024

(54) CRUTCH ACCESSORY SET

(71) Applicant: Barbara Demeter, Vienna (AT)

(72) Inventor: Barbara Demeter, Vienna (AT)

( * ) Notice: Subject to any disclaimer, the term of this patent is extended or adjusted under 35 U.S.C. 154(b) by 722 days.

(21) Appl. No.: 16/980,412

(22) PCT Filed: Mar. 15, 2019

(86) PCT No.: PCT/AT2019/060087
§ 371 (c)(1),
(2) Date: Sep. 13, 2020

(87) PCT Pub. No.: WO2019/173857
PCT Pub. Date: Sep. 19, 2019

(65) Prior Publication Data

US 2021/0045959 A1 Feb. 18, 2021

(30) Foreign Application Priority Data

Mar. 15, 2018 (AT) .............................. A 50219/2018

(51) Int. Cl.
*A47C 3/02* (2006.01)
*A45C 3/06* (2006.01)
(Continued)

(52) U.S. Cl.
CPC ................. *A61H 3/02* (2013.01); *A45C 3/06* (2013.01); *A61H 2003/002* (2013.01); *A61H 2201/0107* (2013.01); *A61H 2201/1638* (2013.01)

(58) Field of Classification Search
CPC ....... A61H 2003/002; A61H 3/02; A45C 3/06
(Continued)

(56) References Cited

U.S. PATENT DOCUMENTS 1,732,763 A * 10/1929 McKeag .................. A61H 3/02
135/73
2,750,951 A * 6/1956 Barnwell ................. A61H 3/02
135/66
(Continued)

FOREIGN PATENT DOCUMENTS

DE 20213182 1/2003
DE 202004000102 4/2004
(Continued)

OTHER PUBLICATIONS 5 page PDF of an English translation of the written opinion dated Mar. 15, 2018 for parent application PCT/AT2019/060087. (Year: 2018).*

(Continued)

*Primary Examiner* — Robert Canfield
(74) *Attorney, Agent, or Firm* — Joseph E. Maenner; Maenner & Associates, LLC

(57) ABSTRACT

The invention relates to a crutch accessory set for two crutches, which comprises: in duplicate, a single- or multi-part cover by which an arm guiding portion and a gripping portion of a crutch can be completely or partially covered, and a container arrangement to accommodate small parts. The container arrangement is composed of two individual containers which can be releasably connected to one another by means of connecting elements, wherein, if the individual containers are separated from one another, in each case one of the two individual containers can be releasably fastened by means of the connecting element to a respective one of the two covers, for which purpose corresponding connecting elements are arranged on each cover. The invention further relates to a kit for persons with impaired mobility, comprising two crutches (forearm crutches), and to a crutch accessory set according to the invention.

17 Claims, 5 Drawing Sheets

(51) Int. Cl.
*A61H 3/02* (2006.01)
*A61H 3/00* (2006.01)

(58) Field of Classification Search
USPC .......................................................... 224/407
See application file for complete search history.

(56) References Cited

U.S. PATENT DOCUMENTS

| | | | | | |
|---|---|---|---|---|---|
| 3,545,462 | A | * | 12/1970 | O'Mahoney | A61H 3/02 135/71 |
| 4,027,687 | A | * | 6/1977 | McGowan | A61H 3/00 D3/10 |
| 4,711,261 | A | * | 12/1987 | Rosenberg | A61H 3/02 135/71 |
| 4,850,383 | A | * | 7/1989 | McBride | A61H 3/02 135/66 |
| 5,101,846 | A | * | 4/1992 | Greatwood | A61H 3/02 135/73 |
| 5,340,005 | A | * | 8/1994 | Woods | A61H 3/02 224/407 |
| 5,465,884 | A | * | 11/1995 | Bohl | A45B 1/00 224/407 |
| 5,526,836 | A | * | 6/1996 | Sigsworth | A61H 3/02 135/66 |
| 5,642,749 | A | * | 7/1997 | Perryman | A61H 3/02 224/407 |
| 6,026,833 | A | * | 2/2000 | Conte | A61H 3/02 224/407 |
| 6,085,765 | A | | 7/2000 | Sigsworth | |
| 6,182,877 | B1 | | 2/2001 | Rolfe | |
| 6,718,994 | B2 | * | 4/2004 | Lewis | A61H 3/02 135/73 |
| D512,559 | S | * | 12/2005 | Silverman | D3/11 |
| 2002/0056736 | A1 | * | 5/2002 | Conte | A61H 3/02 224/661 |
| 2003/0136436 | A1 | * | 7/2003 | Stepp | A45C 13/40 135/66 |
| 2005/0236448 | A1 | * | 10/2005 | Reader | A45B 3/10 224/407 |
| 2006/0097020 | A1 | * | 5/2006 | Johnson | A61H 3/02 224/407 |
| 2007/0074749 | A1 | * | 4/2007 | Jones | A61H 3/02 135/73 |
| 2007/0228094 | A1 | * | 10/2007 | Bednarz | A61H 3/02 224/407 |
| 2018/0035769 | A1 | * | 2/2018 | Wilber | A45B 3/10 |
| 2020/0390636 | A1 | * | 12/2020 | Schuleri | A61H 3/00 |

FOREIGN PATENT DOCUMENTS

| | | |
|---|---|---|
| DE | 20 2007000645 | 4/2007 |
| DE | 202012120004 | 7/2012 |
| FR | 2869222 | 10/2005 |

OTHER PUBLICATIONS

International Search Report for PCT AT2019/060087, dated May 21, 2019. 1 Page.
Search Repor for AT A 50219/2018, dated Feb. 5, 2019. 1 page.

* cited by examiner

CRUTCH ACCESSORY SET

CROSS-REFERENCE

The present application is a U.S. National Stage application of PCT application PCT/AT2019/060087, filed on Mar. 15, 2019, which claims priority from Austrian Patent Application A 50219/2018, filed on Mar. 15, 2018, all of which are incorporated herein by reference in their entireties.

The invention relates to a crutch accessory set for two crutches, specifically forearm crutches, and is useful for people with impaired or restricted mobility, who require two crutches, in particular forearm crutches, to move around.

BACKGROUND OF THE INVENTION

Crutches are generally used to allow people with impaired or restricted mobility, for example due to an injury or illness, to walk. The basic structural design of forearm crutches, also referred to as crutches or walking sticks, is generally known. The latter essentially comprise an elongated support rod, typically made out of metal, with a foot arranged at its lower end. In specific models, the lower end can also be assembled out of an arrangement comprised of several, normally three, feet. Depending on the height of the person with impaired or restricted mobility, the upper end area of the crutch is provided with support means, which have a gripping portion with a handle and a forked arm guiding portion, in which the forearm is supportively accommodated.

In people who require two crutches to move around, most of the body weight is transferred to the crutches. Carrying or slinging on bags for small items and belongings is cumbersome for these persons, or impossible because of pain. For example, slung on bags can have a disruptive effect on body balance while walking with the crutches due to an asymmetrical distribution of bag weight, or impede the use of the crutches.

DE 202 13 182 U1 describes an option for transporting small items for crutch users, specifically a crutch with a container fastened to the support rod for holding small items. However, the solution described therein lacks everyday suitability, since it is impractical for many situations in the lives of people with impaired mobility; for example, the objects located in the container are not close at hand when the crutches have to be put down for medical examinations or when attending events. Therefore, the solution proposed in DE 202 13 182 U1 satisfies neither the practical nor the aesthetic requirements.

BRIEF SUMMARY OF THE PRESENT INVENTION

Therefore, an object of the invention is to eliminate the disadvantages mentioned above and provide a more practical and aesthetically appealing way to transport small items, e.g., belongings, for people with impaired mobility who require two crutches to walk.

This object is achieved by a crutch accessory set of two crutches as mentioned at the outset, which according to the invention is characterized in that it comprises the following:

in duplicate, a single- or multi-part cover, with which an arm guiding portion and a gripping portion of a crutch can be completely or partially covered, and a container arrangement for holding small items, wherein the container arrangement is composed of two individual containers, which can be releasably connected to each other by means of connecting elements, wherein, when the individual containers are separated from each other, a respective one of the two individual containers can be releasably fastened by means of the connecting elements to a respective one of the two covers, wherein corresponding connecting elements are arranged on each cover for this purpose.

The invention provides an accessory set which can be used for all common types of crutches, on the one hand enabling the easy and practical transport of small items, in particular of belongings like money, keys, or medications, while on the other hand being unrestrictedly suitable for daily use and meeting the aesthetic requirements.

The two individual containers of the container arrangement can be releasably fastened on one of the crutch covers for moving around with the crutches. This allows the user with impaired mobility to distribute the contents of the container arrangement, and hence also the weight of the small items, to essentially both individual containers. This counters an asymmetrical distribution of the weight and disruptive effect on body balance while walking with the crutches. As opposed to slung on bags, the two individual containers fastened to the crutch cover also do not impede the use of the crutches.

When the crutches have to be put down, for example during medical examinations, at the restaurant or when attending events, the two individual containers can be released from the two crutches and connected to each other to yield a single container arrangement. The ability to connect the two individual containers to yield a single container arrangement, in particular in the form of a bag, provides a solution that is not only suitable for everyday use and practicable, but also aesthetically appealing. The small items and belongings are always close at hand, and this in the form of a single container.

Possible connecting elements include all types of connecting mechanisms that enable a releasable connection between the covers and the respective individual containers or between the two individual containers; for example, possible connecting elements include buttons, Velcro fasteners, magnetic fasteners, lace fasteners along with all other fastening elements known to the expert and suitable for the present invention.

In addition to being fastened to the cover, each individual container can also be fastened to the respective crutch itself to produce an especially stable attachment between the individual container and respective crutch, for example by means of laces sewn to the individual container, which are tied around the support rod of the crutch.

As used herein, the term "crutch" is to be understood as forearm crutches. As already mentioned above, forearm crutches and their basic structural design are well known.

The covers provided in duplicate in the crutch accessory set can be single- or multi-part, and each cover the arm guiding portion and the gripping portion completely or partially. Covers for crutches are known from prior art, and expediently cover the crutches in the area of the arm guiding portion and the handle, in particular to produce a padding or perspiration absorption, or to satisfy aesthetic requirements.

However, the covers are preferably one-part in design, since this enables a more stable fastening of the cover, and hence also a more stable fastening of the two individual containers of the container arrangement to the respective cover. The one-part cover is preferably cut and dimensioned in such a way as to cover the handle and the forked arm guiding portion that supportively accommodates the forearm of the user. The cover can be fixed to the crutch by means of a cord or elastic band, as well as with any other types of connecting elements, like laces, Velcro fasteners, or buttons.

The covers can be fabricated out of all possible materials known to the expert that are suitable for covers, in particular out of fabric, laminate, leather, or combinations thereof. The cover is preferably made out of fabric, possibly out of multiply fabric panels, since this enables a better perspiration absorption and an improved slip resistance, for example as compared to leather. The term "fabric" comprises all types of fabrics, for example natural fibers, such as cotton, wool or linen, chemical fibers comprised of natural polymers (e.g., viscose, modal), or synthetic fibers (e.g., polyester, nylon, imitation leather). The cover can also be fabricated out of a laminate, for example a multiply, textured polyester laminate; such laminates are well known among experts, and can impart breathable or water-absorbing properties to the cover. Essentially no limits are placed on the design of the covers, e.g., colors, patterns, stitched and decorative seams, various fabric combinations, applications comprised of pearls, sequins, and so on, as long as the covers satisfy their purpose as described in this disclosure.

It is beneficial for at least areas of the cover to have padding so as to have an impact- and pressure-absorbing effect. Padding for forearm crutches is well known, wherein all paddings common for forearm crutches can here be used for the present invention, for example foam rubber, silicone pads, latex, padding with filler material made out of plastic pearls, sheep's wool, etc. The padding is best located at least in the area of the arm support and handle.

The connecting elements are preferably arranged on the respective cover in such a way that each individual container can be releasably fastened in the respective area of the cover that lies on a side of the crutch opposite the arm guiding portion or gripping portion of the crutch when the crutches are covered by the covers. An optimal, primary distribution of the weight of the individual container is achieved in this way, making it particularly easy for the user with impaired mobility to use the crutches provided with the covers and individual containers. In addition, the user finds the individual containers fastened to the crutches in this area to be only slightly bothersome, if at all. An especially advantageous further development of the invention provides that each of the two individual containers have an essentially trapezoidal shape, and that the individual containers can be fastened to the covers in such a way that the shape of the individual containers tapers from the arm guiding portion toward the gripping portion when the crutches are covered by the covers. In this further development, the individual containers preferably designed as bags have a very slender shape and do not disrupt movement.

The container arrangement is preferably fabricated out of a deformable material, for example fabric, laminate, leather, or combinations thereof. The container arrangement preferably takes the form of a handbag, which is possibly provided with a carrying means, such as a belt, a handhold, or a carry handle. Reference is made to the above statements about the covers with respect to the types of material (e.g., fabrics, laminates, leather, etc.) and the design. If present in the form of a handbag, the container arrangement that can be comprised of the two individual containers is best fabricated out of a soft, flexible material, e.g., fabric or leather. No limits are placed on the design of the carrying means, e.g., a belt, a handhold, or a carry handle; for example, the carrying means can be a shoulder belt that can be fastened to the container arrangement by means of hooks or karabiners, or a simple carry handle. In special designs, it is also conceivable that the container arrangement or two individual containers be dimensionally stable. The covers and the container arrangement/handbag can be fabricated out of the same material, e.g., out of the same fabric, or different fabrics or materials. For example, the cover can be fabricated out of a readily perspiration absorbing material, while the handbag is fabricated out of leather or out of a waterproof fabric. Depending on the desired design, the container arrangement or the individual containers can further have different inner bags or even additionally small outer bags that were sewn on or in some other way fastened thereto. Essentially no limits are placed on the design of the container arrangement, e.g., colors, patterns, stitched and decorative seams, various fabric combinations, applications comprised of pearls, sequins, and so on, as long as the container arrangement that can be releasably assembled out of two individual containers satisfies its purpose as described in this disclosure.

In order to obtain as symmetrical a weight distribution on the two crutches or an appealing appearance of the crutches fitted with the individual containers, it is advantageous that the individual containers of the container arrangement be congruent with each other and have essentially the same overall volume.

In an advantageous further development of the crutch accessory set according to the invention, the latter has a protective wrap in duplicate to protect the hands, e.g., against cold, moisture, or sunlight, wherein the protective wrap is dimensioned and can be releasably fastened to the respective wrap or to the respective crutch in such a way that at least an area of the respective hand of the crutch user that grasps the gripping portion can be covered by the protective wrap. The respective protective wraps are best configured in such a way that the user can slip his or her hands through an opening under the respective protective wraps, so that the hands are protected against cold and moisture, e.g., rain or snow, or even against sunlight. The protective wrap is preferably fabricated out of a warming and weatherproof material, e.g., a multiply material comprised of a warming fabric panel of wool felt in combination with a rainproof and windproof outer layer made out of a membrane laminate (e.g., Gore-Tex).

The invention further relates to a kit for people with impaired mobility, comprising two crutches (forearm crutches) and a crutch accessory set according to the invention disclosed herein.

The invention along with additional advantages will be described in more detail below based on nonrestrictive examples and attached drawings, wherein the drawings show:

DETAILED DESCRIPTION OF THE INVENTION

It goes without saying that the embodiments and variants described here are only for illustrative purposes, and must not be construed as limiting for the invention; rather, the protective scope of the invention extends to all embodiments that the expert can find based upon the description, wherein the protective scope is established by the claims.

The same reference numbers are used on the figures for the same or comparable elements to simplify the explanations and illustrations. The reference numbers used in the claims are further intended solely to make the claims easier to read and the invention easier to understand, and by no means have a character that detracts from the protective scope of the invention.

Figure 1:
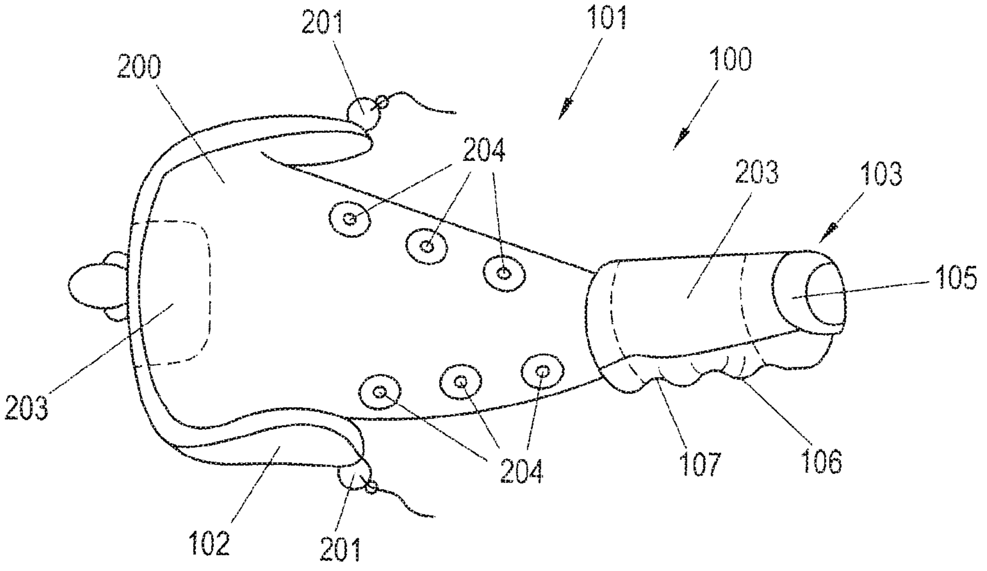
FIG. 1 a perspective front view of the upper area of a forearm crutch, comprising an arm guiding portion and a gripping portion, which are covered by a cover of the crutch accessory set according to the invention, FIG. 2 a rear view of the arrangement depicted on FIG. 1, FIG. 3 a front view of the arrangement depicted on FIG. 1, FIG. 4 a side view of the arrangement depicted on FIG. 1, FIG. 5 a schematic view of a handbag-shaped container arrangement of a crutch accessory set according to the invention, FIG. 6 the container arrangement on FIG. 5 in a half-assembled form, FIG. 7 an individual container of the container arrangement on FIG. 5, FIG. 8 the individual container on FIG. 7, which is fastened to an arrangement according to FIG. 1, FIG. 9 a further development of the arrangement depicted on FIG. 8 in a front view, comprising a protective wrap for protecting the hand, and FIG. 10 the arrangement on FIG. 9 as viewed in perspective from the side.
Figure 2:
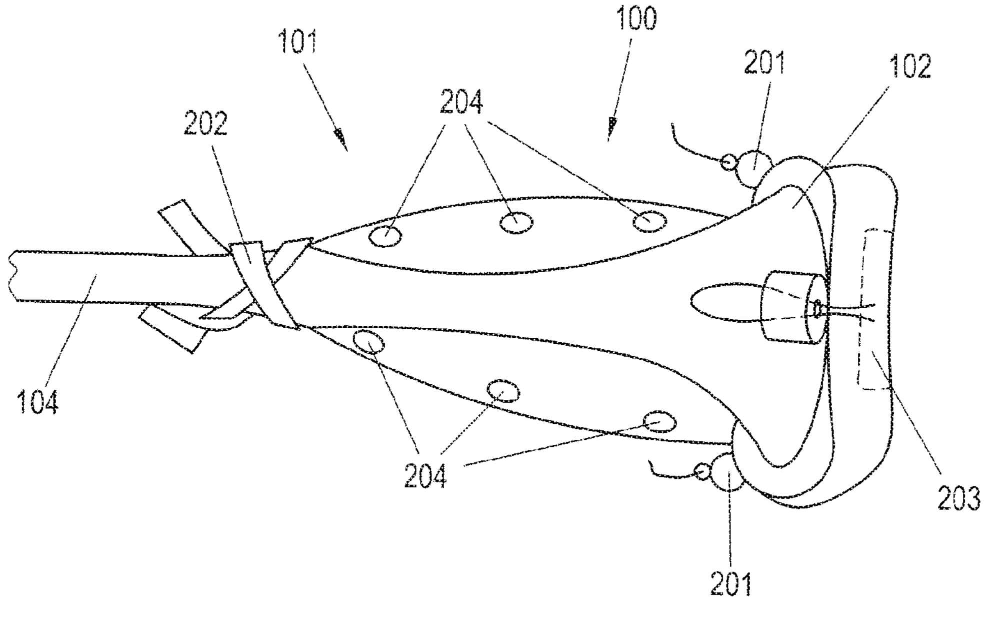
Figure 3:
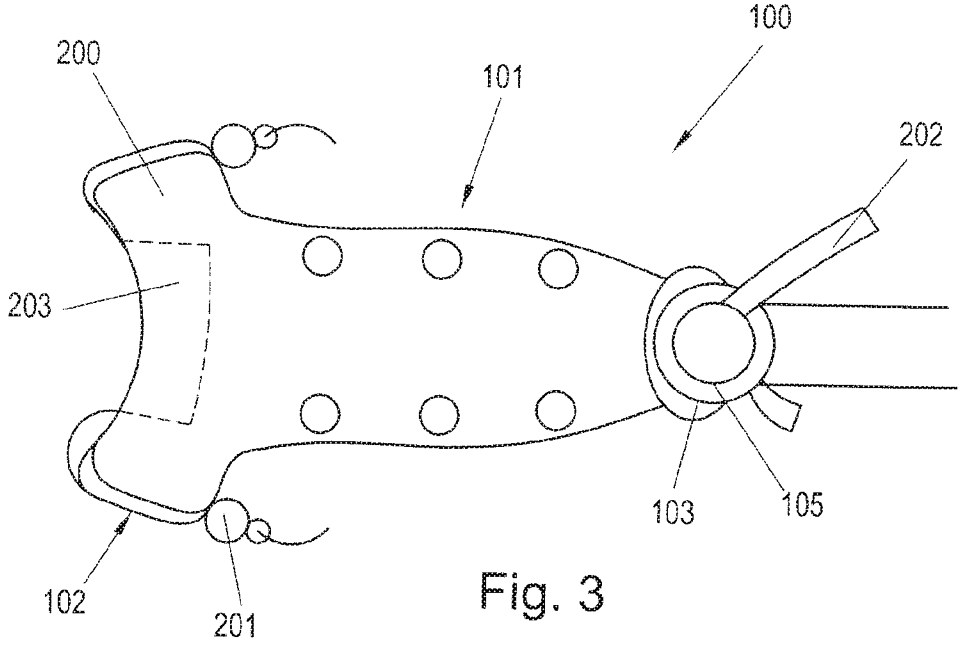
Figure 4:
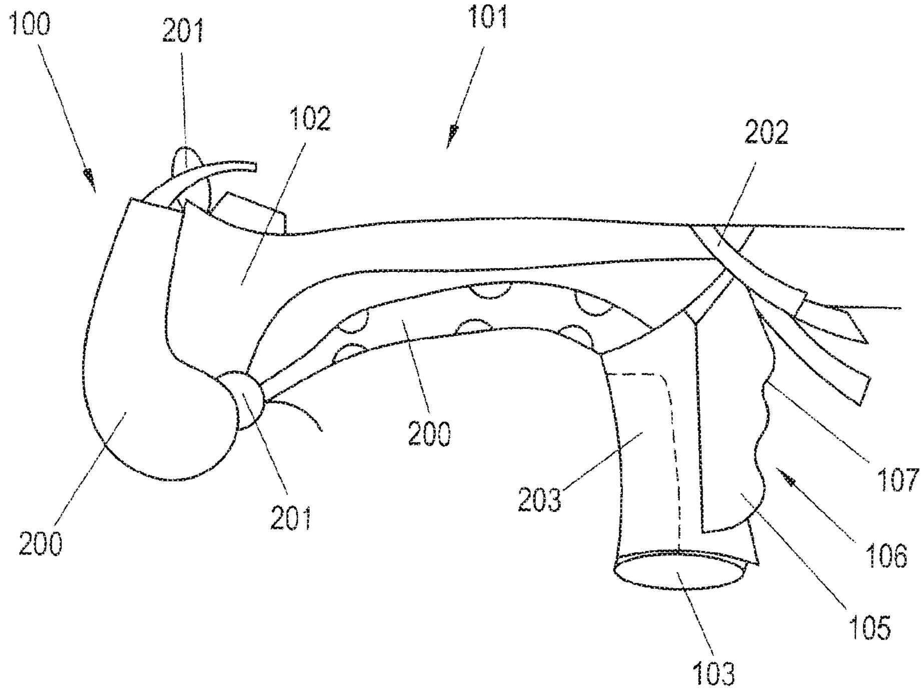

FIG. 1 shows a perspective front view of the upper end area 101 of a forearm crutch 100, comprising an essentially forked arm guiding portion 102 and a gripping portion 103, which are covered by a cover 200 of the crutch accessory set according to the invention. FIG. 2 shows a rear view, FIG. 3 shows a front view, and FIG. 4 shows a side view of the arrangement shown on FIG. 1. The basic structural design of a forearm crutch, parts of which are shown on FIG. 1-4, is generally known. The forearm crutch 100 comprises an essentially elongated (entire length not shown) support rod 104, typically made out of metal, with a foot (not shown) at its lower end. Depending on the height of the person with impaired or restricted mobility, the upper end area 101 of the forearm crutch 100 is provided with support means, which have the gripping portion 103 and the forked arm guiding portion 102, in which the forearm of the person is supportively accommodated. The gripping portion 103 comprises a handle 105 of a known kind.

As ready evident from FIG. 1-4, areas of the arm guiding portion 102 and the gripping portion 103 of the crutch 100 are covered with a single-part cover 200, with the cover 200 specifically extending primarily over those areas of the upper end area 101 which support the forearm or the hand of the user while walking. In the example shown, the cover 200 is fastened by means of a drawstring 201 in the upper area of the arm guiding portion 102, and with a lacing 202 to the gripping portion 103. However, as will be clear to the expert, the cover 200 can also be fixed to the crutch 100 by means of other fastening mechanisms, for example Velcro fasteners or buttons. Each gripping area 106 of the handle 105 facing away from the palm of the user is here exposed, so that the user can easily hold the grooves 107 located thereon with his or her fingers.

Further arranged on the cover is a plurality of connecting elements 204 (in the form of buttons in the example shown), so as to releasably fasten a bag component 301 of a bag 300 thereto, as will be explained in more detail below.

As already explained at length above in the introduction to the specification, the covers 200 can be fabricated out of all possible materials suitable for covers and known to the expert, in particular out of fabric, laminate, leather, or combinations thereof. As likewise outlined in detail above, the cover 200 can additionally comprise impact- and pressure-absorbing paddings 203; in the example shown, the paddings 203 are arranged in the upper area of the arm guiding portion 102 as well as the gripping portion 105, and depicted as dashed fields on the figures. Reference is hereby made to the above statements in the introduction to the specification.

The crutch accessory set according to the invention is provided for two forearm crutches, and thus advantageous for people who require two forearm crutches for walking. Therefore, a crutch accessory set according to the invention comprises a cover 200 depicted on FIG. 1-4, provided at least in duplicate. The crutch accessory set according to the invention further comprises a container arrangement 300 that is described below and depicted on FIGS. 5 and 6.

Figure 5:
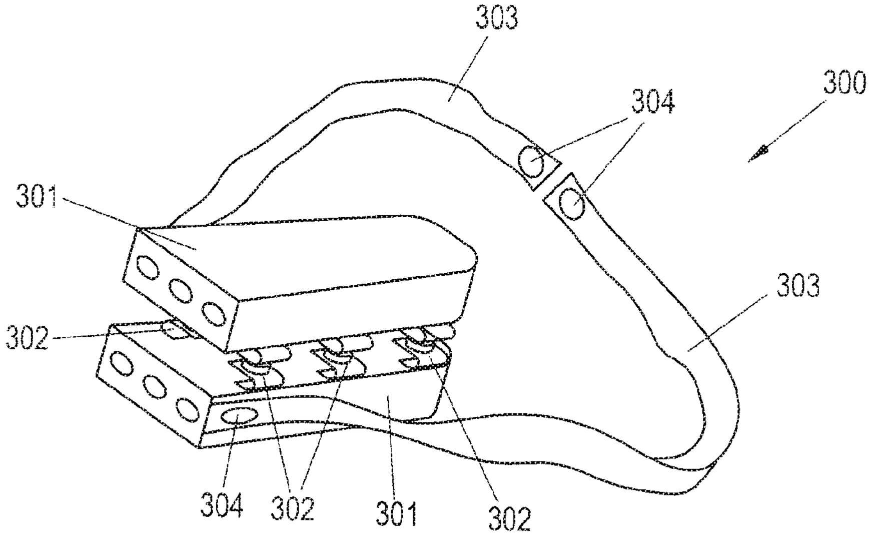
Figure 6:
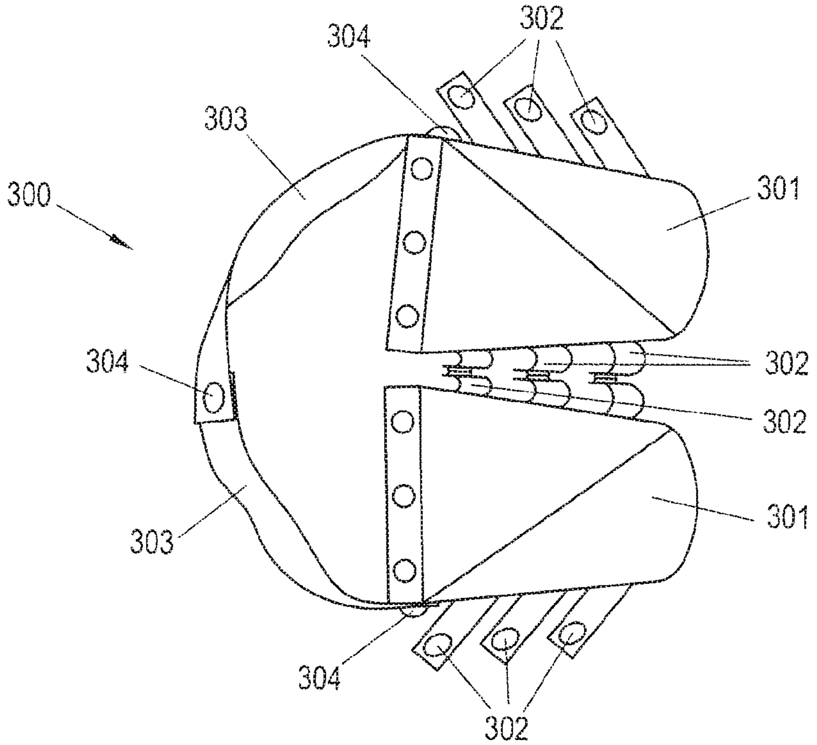
Figure 7:
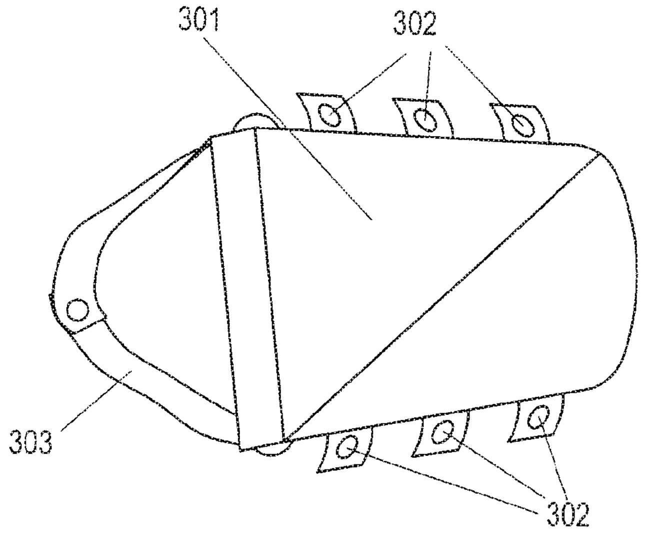

FIG. 5 shows a schematic view of a handbag-like container arrangement 300 (hereinafter referred to as bag 300 for short) of a crutch accessory set according to the invention. FIG. 6 shows the bag 300 on FIG. 5 in a semi-assembled form, and FIG. 7 shows an individual container (hereinafter referred to as bag component 301) of the bag 300 on FIG. 5.

The bag 300 is composed of two essentially congruent bag components 301. The bag components 301 can be releasably connected with each other by means of connecting elements 302 (in the form of buttons 302 in the example shown), so as to yield the bag 300 in the connected state. The bag 300 is fabricated out of a soft, flexible material, e.g., fabric, laminate, or leather. It also has a shoulder belt 303 as the carrying means; the shoulder belt 303 can be fastened to the bag 300 and removed again by means of buttons 304. Reference is made to the above statements in the introduction to the specification with respect to the types of materials (e.g., fabrics, laminates, leather, etc.) and the design of the bag 300 or bag components 301.

Figure 8:
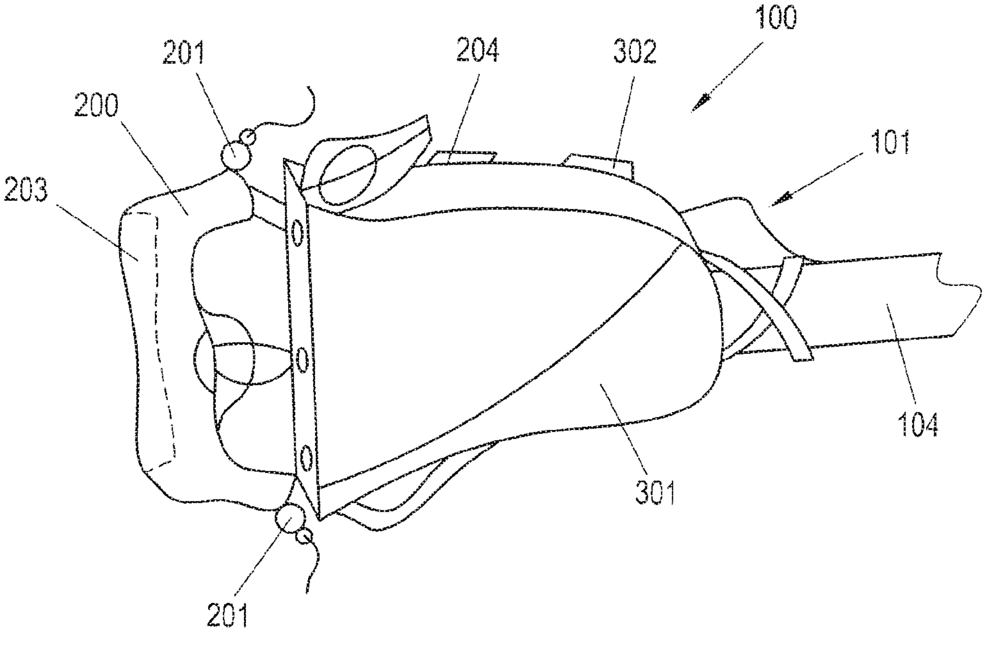

FIG. 8 now shows a schematic view of how one of the two bag components 301 of the bag 300 is fastened to a cover 200, which according to the illustration on FIG. 1 is fastened at the end area 101 of the crutch 100. The bag component 301 is fastened to the corresponding connecting elements 204 of the cover 200 by means of the connecting elements 302.

As a consequence, a respective bag component 301 can be fastened to each of the crutches 100 by being fastened to the cover 200. This allows people who need two forearm crutches to easily and practically transport small items, in particular belongings such as money, keys, or medication, on the one hand, while this solution is unlimitedly suitable for everyday use and satisfies the aesthetic requirements on the other.

In the examples shown, buttons are depicted as the connecting elements 204 and 302. However, as is clear to the expert, all types of connecting mechanisms are possible that enable a releasable connection between the covers 200 and the respective bag components 301 or between the two bag components 301; apart from buttons, possible connecting elements include Velcro fasteners, zippers, magnetic fasteners, lace fasteners along with all other fastening elements known to the expert and suitable for the present invention.

As readily evident from FIGS. 6 and 7, the two bag components 301 have an essentially trapezoidal shape. As depicted on FIG. 8, the respective bag component 301 is now fastened to the respective cover 200 of the respective forearm crutch 100 in such a way that the shape of the bag component 301 tapers from the arm guiding portion 102 toward the gripping portion 103. This is realized in an especially easy way by the trapezoidal shape of the bag components 301. The bag component 301 fastened to the cover 200 is very slender in shape, and thus does not bother the user while walking.

Figure 9:
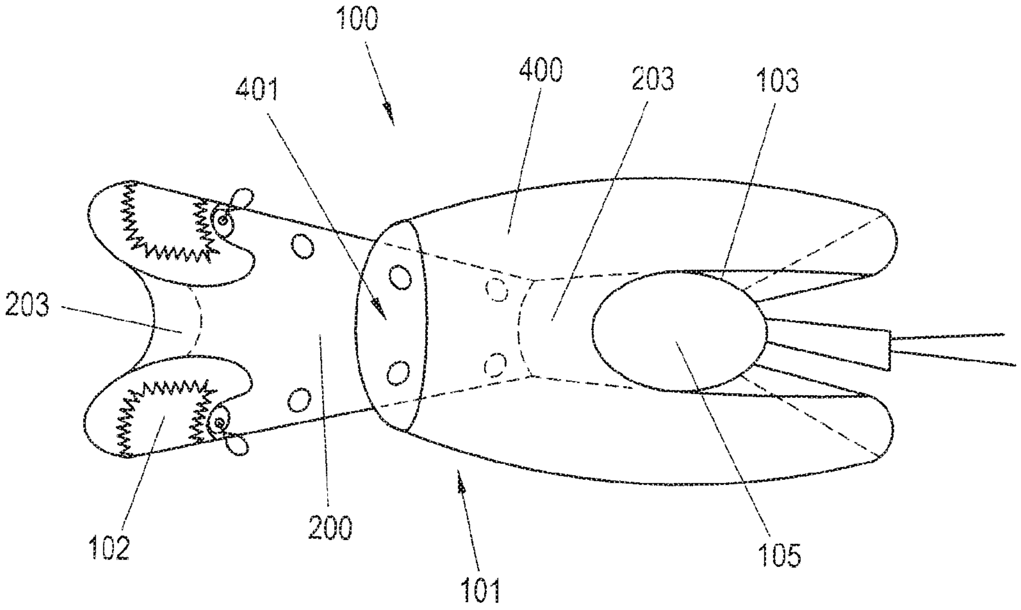
Figure 10:
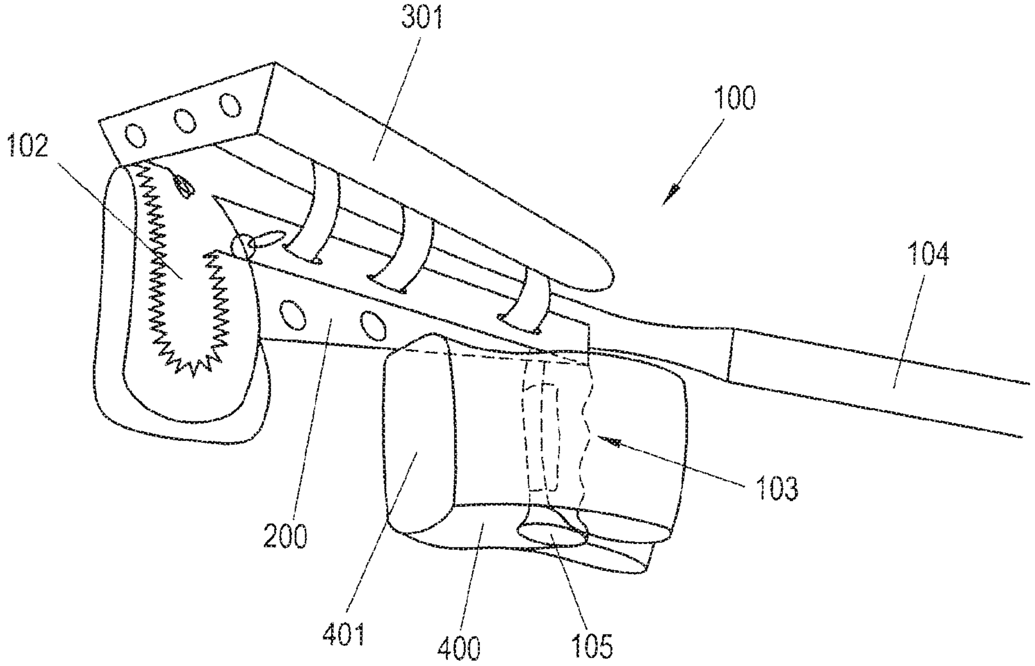

FIG. 9 shows a further development of the arrangement depicted on FIG. 8 of a crutch 100 with a cover 200 and a bag component 301 in a front view, and FIG. 10 shows the further development on FIG. 9 as viewed in perspective from the side. In the further development shown on FIG. 9, a protective wrap 400 is additionally provided to protect the hand of the user. The protective wrap 400 protects the hand of the user, e.g., against cold, moisture, or sunlight, and is dimensioned and can be releasably fastened to the wrap 200 or to the forearm crutch 100 in such a way that at least an area of the respective hand of the user grasping the handle 105 is covered by the protective wrap 400. The user can slip his or her hand through the opening 401 under the protective wrap 400, so that the hands are protected against cold and moisture, e.g., rain or snow, or against sunlight. For example, the protective wrap 400 is fabricated out of a warming and weatherproof material, e.g., a multiply material comprised of a warming fabric panel of wool felt in combination with a rainproof and windproof outer layer made out of a membrane laminate (e.g., Gore-Tex).

A crutch accessory set for two crutches according to the further development of the invention shown on FIGS. 9 and 10 thus comprises a cover 200 depicted on FIG. 1-4, at least in duplicate, a container arrangement 300 as well as a protective cover 400, at least in duplicate.

The invention can be modified in any way known to the expert, and is not limited to the embodiments shown. Individual aspects of the invention can also be taken and largely combined with each other. The ideas underlying the invention are essential, which in view of this instruction can be implemented by an expert in manifold ways, and still be sustained as such.

Please amend the claims as follows, without prejudice:

1. A crutch accessory set (100), characterized in that the set comprises:

in duplicate, a single- or multi-part cover (200), with which an arm guiding portion (102) and a gripping portion (103) of a crutch (100) can be completely or partially covered, and a container arrangement (300) for holding small items, wherein the container arrangement (300) is composed of two individual containers (301), which can be releasably connected to each other by means of connecting elements (302), wherein, when the individual containers (301) are separated from each other, a respective one of the two individual containers (301) can be releasably fastened by means of the connecting elements (302) to a respective one of the two covers (200), wherein corresponding connecting elements (204) are arranged on each cover (200) for this purpose.

2. The crutch accessory set according to claim 1, characterized in that each cover (200) has a single-part design.

3. The crutch accessory set according to claim 1, characterized in that the connecting elements (204) are arranged on the respective cover (200) in such a way that each individual container (301) can be releasably fastened in the respective area of the cover (200) that lies on a side of the crutch (100) opposite the arm guiding portion (102) or gripping portion (103) of the crutch (100) when the crutches (100) are covered by the covers (200).

4. The crutch accessory set according to claim 3, characterized in that the individual containers (301) can be fastened to the respective cover (200) in an area between the arm guiding portion (102) and the gripping portion (103) when the crutches (100) are covered by the covers (200).

5. The crutch accessory set according to claim 4, characterized in that each of the two individual containers (301) has an essentially trapezoidal shape, and the individual containers (301) can be fastened to the covers (200) in such a way that the shape of the individual containers (301) tapers from the arm guiding portion (102) toward the gripping portion (103) when the crutches (100) are covered by the covers (200).

6. The crutch accessory set according to claim 1, characterized in that the container arrangement (300) is fabricated out of a deformable material.

7. The crutch accessory set according to claim 6, characterized in that the material comprises a fabric.

8. The crutch accessory set according to claim 6, characterized in that the material comprises a laminate.

9. The crutch accessory set according to claim 6, characterized in that the comprises leather.

10. The crutch accessory set according to claim 1, characterized in that the container arrangement (300) takes the form of a handbag, which is possibly provided with a carrying means (303).

11. The crutch accessory set according to claim 10, characterized in that the carrying means (303) comprises a belt.

12. The crutch accessory set according to claim 10, characterized in that the carrying means comprises a handhold.

13. The crutch accessory set according to claim 10, characterized in that the carrying means (303) comprises a carry handle.

14. The crutch accessory set according to claim 1, characterized in that the individual containers (301) of the container arrangement (300) are congruent to each other, and essentially have the same overall volume.

15. The crutch accessory set according to claim 1, characterized in that at least areas of the cover (200) have a padding.

16. The crutch accessory set according to claim 1, characterized in that it further has a protective wrap (400) in duplicate to protect the hands against cold, moisture, or sunlight, wherein the protective wrap (400) is dimensioned and can be releasably fastened to the respective wrap (200) or to the respective crutch (100) in such a way that at least an area of the respective hand of the crutch user that grasps the gripping portion (103) can be covered by the protective wrap (400).

17. A kit for people with impaired mobility, comprising a crutch and the crutch accessory set according to claim 1.

* * * * *